United States Patent
Yi et al.

(10) Patent No.: US 10,454,651 B2
(45) Date of Patent: Oct. 22, 2019

(54) METHOD OF REPORTING CHANNEL STATE INFORMATION AND APPARATUS THEREOF

(71) Applicant: LG ELECTRONICS INC., Seoul (KR)

(72) Inventors: Yunjung Yi, Seoul (KR); Suckchel Yang, Seoul (KR); Hyangsun You, Seoul (KR); Joonkui Ahn, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/894,257

(22) PCT Filed: Jul. 25, 2014

(86) PCT No.: PCT/KR2014/006847
§ 371 (c)(1),
(2) Date: Nov. 25, 2015

(87) PCT Pub. No.: WO2015/012653
PCT Pub. Date: Jan. 29, 2015

(65) Prior Publication Data
US 2016/0182208 A1    Jun. 23, 2016

Related U.S. Application Data

(60) Provisional application No. 61/858,129, filed on Jul. 25, 2013.

(51) Int. Cl.
*H04L 5/00* (2006.01)
*H04B 17/309* (2015.01)
(Continued)

(52) U.S. Cl.
CPC .......... *H04L 5/0057* (2013.01); *H04B 17/24* (2015.01); *H04B 17/309* (2015.01);
(Continued)

(58) Field of Classification Search
CPC ... H04L 5/0057; H04L 1/0026; H04B 17/309; H04W 72/0446
See application file for complete search history.

(56) References Cited

U.S. PATENT DOCUMENTS 9,661,616 B2 *   5/2017   Golitschek Edler Von
                          Elbwart ............ H04W 72/0413
2009/0196237 A1  8/2009   Jonsson
(Continued)

FOREIGN PATENT DOCUMENTS

CN   102113258 A        6/2011
WO   WO 2012/169817 A2  12/2012
WO   WO 2013/060763 A1  5/2013

OTHER PUBLICATIONS

3GPP TSG-RAN WG1 Meeting #73 R1-132300 May 20-24, 2013 "On PDCCH-less subframes" Nokia (Year: 2013).*

*Primary Examiner* — Jeffrey M Rutkowski
*Assistant Examiner* — Basil Ma
(74) *Attorney, Agent, or Firm* — Birch, Stewart, Kolasch & Birch, LLP

(57) ABSTRACT

A method of reporting channel state information by a coverage-limited user equipment (UE), the method comprises receiving signals on a downlink channel including a downlink control channel and a downlink data channel, performing measurement of channel state information on the downlink channel and reporting channel state information including channel quality indicator based on the measurement.

10 Claims, 6 Drawing Sheets

(51) Int. Cl.
 *H04W 72/04* (2009.01)
 *H04L 1/00* (2006.01)
 *H04B 17/24* (2015.01)

(52) U.S. Cl.
 CPC ....... *H04L 1/0026* (2013.01); *H04W 72/0446* (2013.01); *H04L 5/001* (2013.01)

(56) References Cited

U.S. PATENT DOCUMENTS

| | | |
|---|---|---|
| 2010/0272019 A1 | 10/2010 | Papasakellariou et al. |
| 2011/0103335 A1* | 5/2011 | Golitschek Edler von Elbwart ................ H04L 1/0026 370/329 |
| 2011/0261868 A1 | 10/2011 | Bachl et al. |
| 2013/0083753 A1* | 4/2013 | Lee ................... H04W 72/0453 370/329 |
| 2013/0294361 A1* | 11/2013 | Chen ..................... H04L 5/0053 370/329 |
| 2014/0036804 A1* | 2/2014 | Chen ................. H04W 72/0406 370/329 |
| 2014/0146689 A1* | 5/2014 | Gaur ................... H04J 11/0053 370/252 |
| 2017/0135121 A1* | 5/2017 | Eyuboglu ............ H04W 72/12 |

* cited by examiner

[Fig. 1]
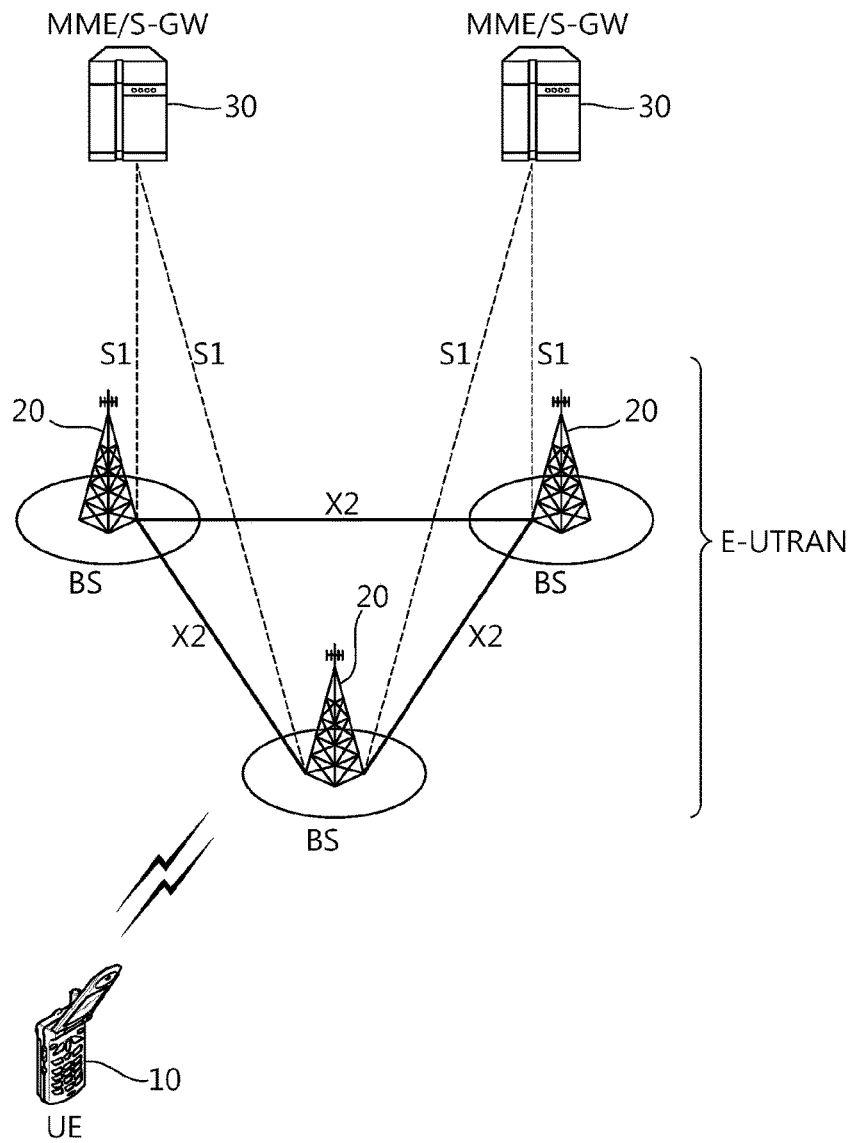

[Fig. 2]
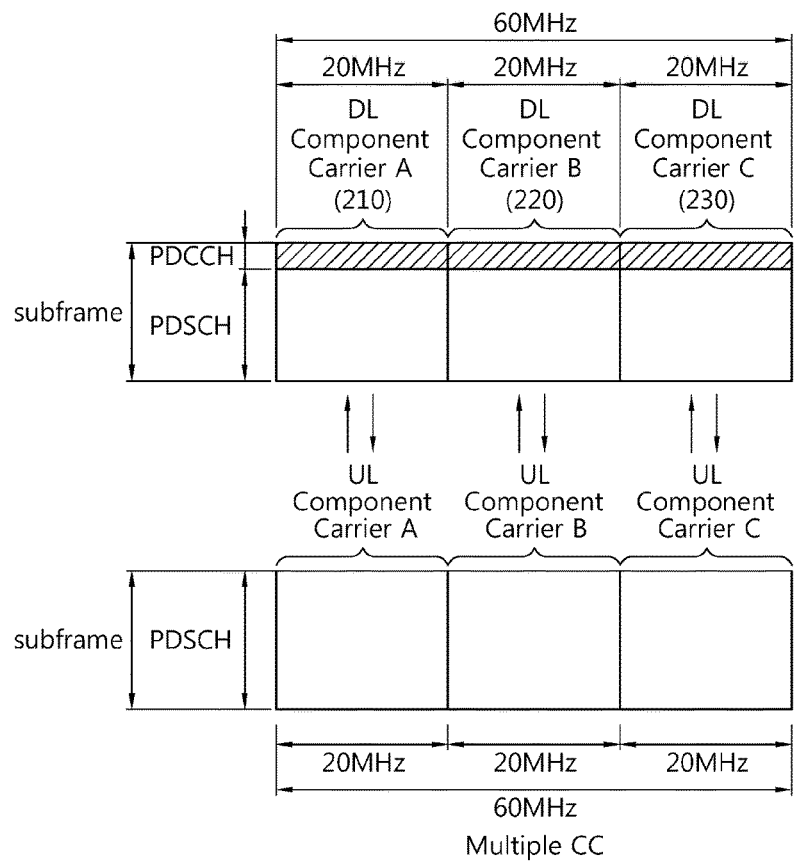
[Fig. 3]
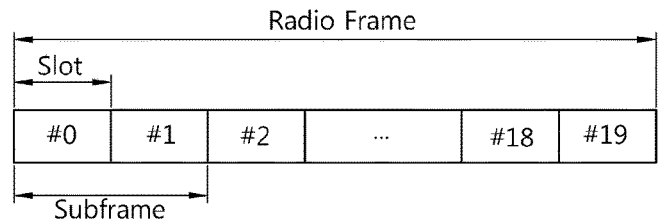

[Fig. 4]
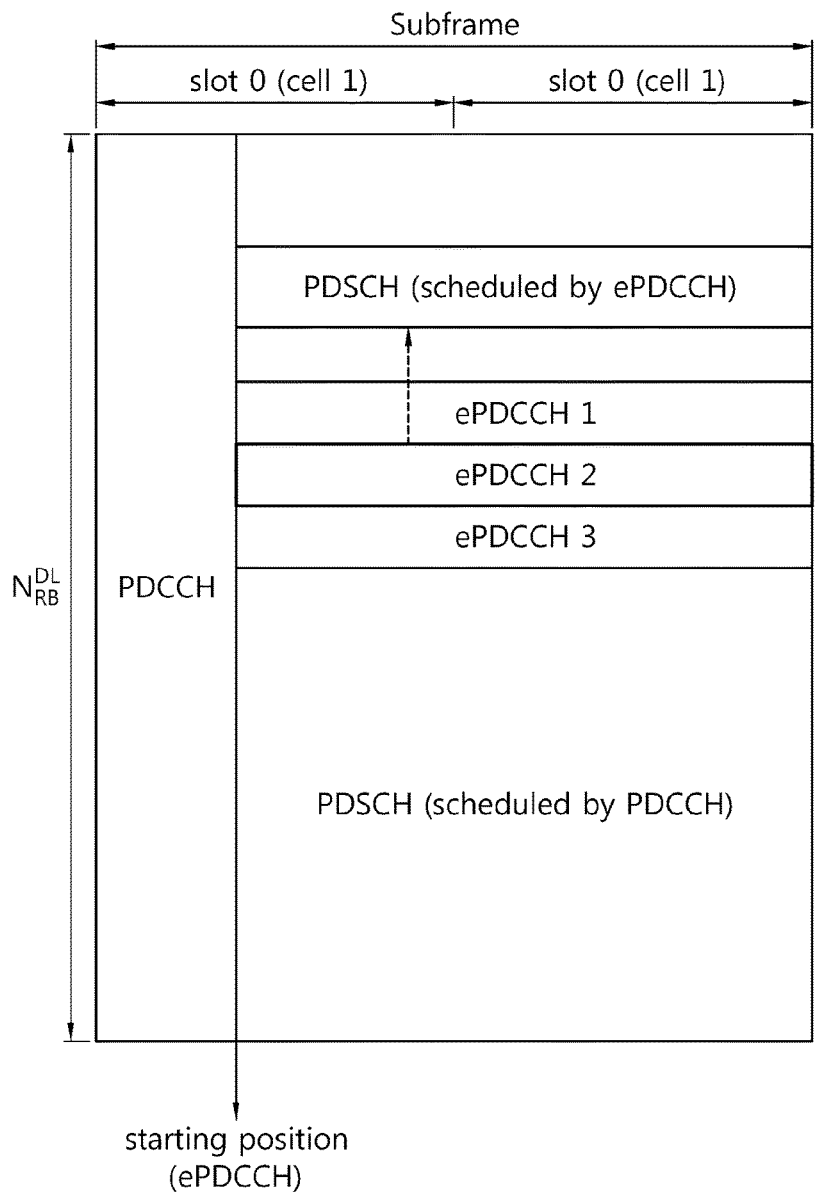

[Fig. 5]
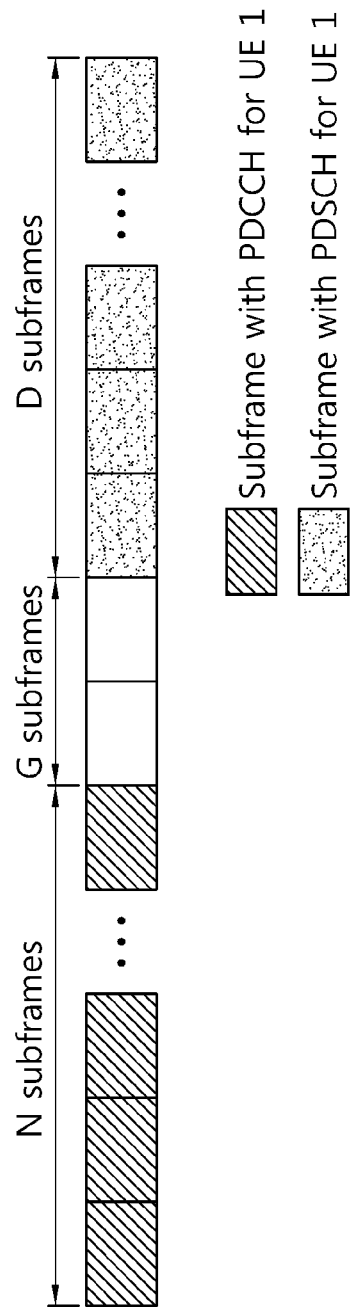

[Fig. 6]
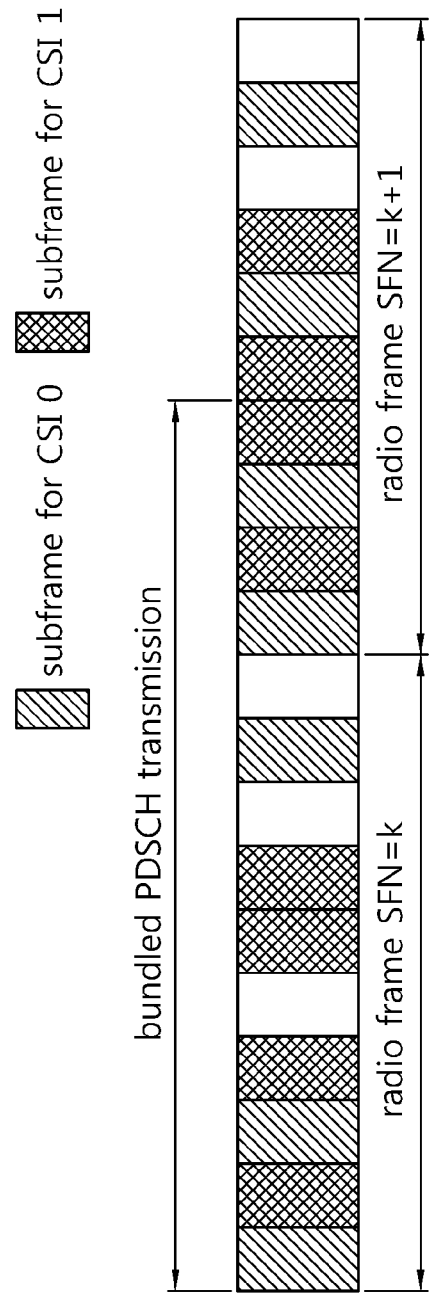

[Fig. 7]
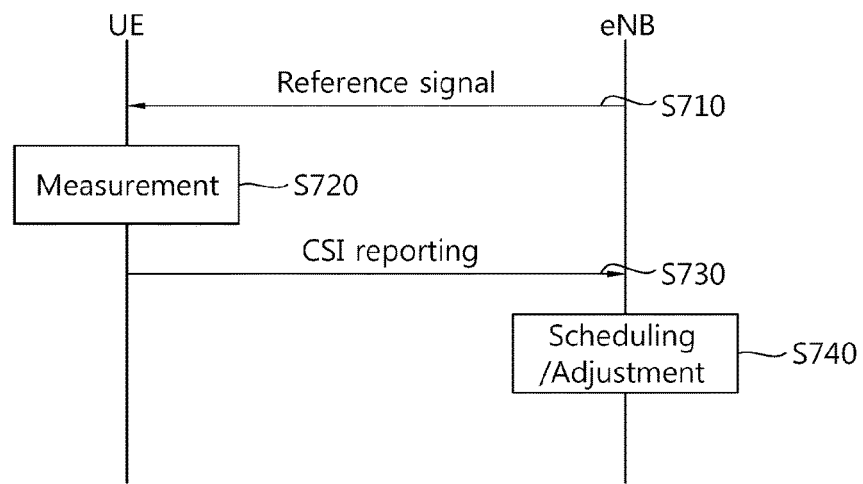
[Fig. 8]
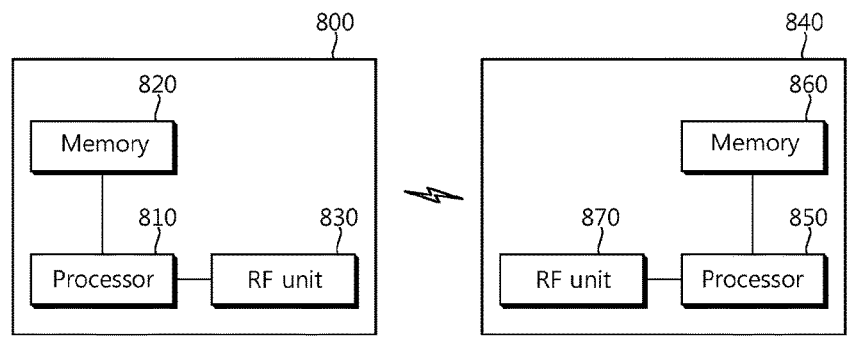

METHOD OF REPORTING CHANNEL STATE INFORMATION AND APPARATUS THEREOF

CROSS REFERENCE TO RELATED APPLICATIONS

This application is the National Phase of PCT International Application No. PCT/KR2014/006847, filed on Jul. 25, 2014, which claims priority under 35 U.S.C. 119(e) to U.S. Provisional Application No. 61/858,129, filed on Jul. 25, 2013, all of which are hereby expressly incorporated by reference into the present application.

TECHNICAL FIELD

The present invention relates to wireless communication, specifically channel state information reporting for User Equipments either in coverage-limiting conditions or UEs serviced with simultaneous retransmission.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

In next generation of LTE-A, it is considered configuring a system using a low cost and/or low specification (low performance) terminal mainly for a data communication such as reading an electric meter, measuring water level, surveillance, stock management of a vending machine, etc. The terminal may be called as machine type communication (MTC) device (MTC terminal) for a convenience of description.

As for the usage of the MTC device, it is efficient to use a MTC device with a low price and a low battery consumption since an amount of transmitted data may be small and there may occasionally be an uplink/downlink data transmission in a case of a communication using the MTC device.

SUMMARY OF INVENTION

Technical Problem

Another object of the present invention is to provide method of reporting channel state information for coverage limiting user equipment.

Another object of the present invention is to provide method of adjust transmission power for coverage limiting user equipment.

Another object of the present invention is to provide method of determining valid subframe for coverage limiting user equipment.

Solution to Problem

An embodiment for the present invention is method of reporting channel state information by a coverage-limited user equipment (UE), the method comprising receiving signals on a downlink channel including a downlink control channel and a downlink data channel, performing measurement of channel state information on the downlink channel, and reporting channel state information including channel quality indicator based on the measurement, wherein the step of performing measurement includes measuring channel quality on subframes configured for the coverage-limited UE, wherein the subframes on which the measurement performed comprises subsets of subframes for channel state information reporting, and wherein subframes in a subset are enabled to be bundled for channel state information measurement.

Another embodiment for the present invention is an user equipment (UE) having a limited coverage, the UE comprising a radio frequency (RF) unit for transmitting and receiving a radio signal, and a processor operatively coupled to the RF unit, wherein the processor is configured for transmitting signals via the RF unit based on a scheduling for UL and/or DL, wherein the processor measures channel quality on subframes configured for a coverage-limited UE, wherein the subframes on which the measurement performed comprises subsets of subframes for channel state information reporting, and wherein subframes in a subset are enabled to be bundled for channel state information measurement.

Advantageous Effects of Invention

According to the present invention, channel state information can be efficiently reported by coverage limiting user equipment.

According to the present invention, transmission power for coverage limiting user equipment can be efficiently adjusted.

According to the present invention, valid subframe for coverage limiting user equipment can be efficiently determined.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 briefly illustrates an example of repeated transmission for the coverage-limiting UE.

FIG. 6 briefly describes an example of restricted CSI measurement.

FIG. 7 is a flow chart briefly describing a coverage-limiting UE's operation according to the present invention.

FIG. 8 is a block diagram which briefly describes a wireless communication system.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmitting sounding reference signal (SRS) on the SCell, not reporting CQI/PMI/RI/PTI for the SCell, not transmitting on UL-SCH on the SCell, not monitoring the PDCCH on the SCell, and not monitoring the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, as wireless communications are to be used in various technical fields and for various purposes, it is considered configuring a system using a low cost and/or low specification (low performance) terminal mainly for a data communication such as reading an electric meter, measuring water level, surveillance, stock management of a vending machine, etc. This type of a terminal may be called as machine type communication (MTC) device (MTC UE).

Transmission data is small for the MTC UE. Further, Uplink/Downlink data transmission and reception are occasionally performed for the MTC UE. Thus, it is efficient to reduce battery consumption and device cost according to such a low data transmission rate.

Furthermore, it is expected that those MTC devices are installed in rather coverage-limited area such as basement. To enhance the coverage enhancement while reducing the cost of MTC devices, this application assumes that the network may handle both normal UEs and coverage limiting UEs which are enabled to operate with coverage enhancement techniques applied.

In the LTE, UE categories are specified. The normal UE may correspond to category 0 to 9 with no additional support for coverage enhancement. Further, it can be also the normal UE when the UE does not support coverage enhancement techniques even if it belongs to a newly defined UE category.

To avoid the unnecessary spectral efficiency degradation to handle coverage-limiting UEs, it is essential to do best "estimation" on the required coverage enhancement. Also, handling this new type of UEs should not jeopardize the legacy UEs which are not aware of the existence of coverage limiting UEs.

For support coverage-limiting UE, some transmission can be repeated. For example, at least one of PDCCH, PDSCH, PUCCH, PUSCH can be transmitted over several subframes.

FIG. 5 briefly illustrates an example of repeated transmission for the coverage-limiting UE.

Referring to the FIG. 5, for a UE1 which may be a coverage-limiting UE, PDCCH is transmitted repeatedly over N (N is an integer and 0<N) subframes and PDSCH is transmitted repeatedly over D (D is an integer and 0<D) subframes.

In this application, it is discussed how to support processes for channel state information (CSI) for the coverage-limiting when a number of PDCCH/PDSCH/PUCCH would be repeated over multiple subframes.

Hereinafter, CSI related processes for a coverage-limiting UE is described, for example, PMI-RI report configuration for a coverage-limiting UE, aperiodic CSI triggering for the coverage-limiting UE, Restricted CSI measurement for the coverage limiting UE, CQI calculation for the coverage-limiting UE, valid subframe for the coverage-limiting UE, etc.

PMI-RI Report Configuration for Coverage-Limiting UE

When the transmission/reception performed under MIMO (Multi-Input/Multi-Output), PMI (Precoding Matrix Indicator)-RI (Rank Indicator) reporting should not be assumed for a coverage-limiting UE even if CSI reporting (periodic) is enabled.

CSI information may include RI, PMI, etc. RI may indicate a number of layers used for transmission. Rank cannot exceed minimum value of the number of transmission antennas and the number of reception antennas Rank may be decided based on the similarity between antenna channels.

PMI may indicate information on a precoding matrix which maximizes signal-to-interference plus noise ratio (SINR) at a receiving-end. PMI may be used for determining a precoding matrix used for transmission at transmitting-end when the PMI is fed back from receiving-end.

When a UE is configured with PMI-RI-report=ON, the UE ignores the configuration and report CSI assuming PMI-RI-report=OFF and the UE does not report periodic CSI any longer when the UE is a coverage-limiting UE.

Besides, the UE may interpret PMI-RI-report=ON as "disable" CSI process and thus the UE does not report periodic CSI any longer when the UE is a coverage-limiting UE.

Thus, a UE assumes that CSI-RS resource is not configured to the UE when the UE is a coverage-limiting UE. A coverage-limiting UE may be informed of CSI-RS configuration which should be treated as "puncturing" or "rate matching" in those configured CSI-RS REs. With this, it is always assumed that RI=1.

Alternatively, this configuration may be used to enable periodic CSI reporting or not. A coverage-limiting UE, due to its nature, assumes that periodic CSI reporting is disabled. When the UE is configured with PMI-RI-report=ON, the UE shall assume that periodic CSI reporting is enabled, and thus it would report CQI periodically. If PMI-RI-report=OFF is reconfigured, the UE shall assume that periodic CSI reporting is disabled.

Of course, a separate configuration parameter could be used to disable/enable periodic CSI reporting.

Aperiodic CSI Triggering

Aperiodic CSI timing is same as to the timing of uplink data channel e.g. PUSCH. In other words, aperiodic CSI piggybacked on PUSCH will be triggered once uplink grant with CSI request has received.

Upon receiving a CSI request at n-th subframe (n is integer) i.e., upon receiving PDCCH carrying uplink grant, aperiodic CSI will be reported following the PUSCH timing.

For example, n+k–th subframe (k is integer) can be determined as aperiodic CSI reporting timing when CSI request received at n-th subframe and corresponding uplink grant is for the n+k–th subframe. The value of the k in FDD may be 4.

Table 1 is an example of values of k for TDD configuration and table 2 is an example of TDD uplink/downlink configuration. Referring to table 1, the uplink timing, i.e. CSI reporting timing can be determined with k for the TDD configuration on the table 2.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For a coverage-limiting UE, the mode where wideband CQI is transmitted without PMI should be supported for all transmission modes. This kind of CSI reporting mode can be called as mode 1-0. In addition, CSI reporting mode with UE selected PUSCH CQI feedback and no PMI can be called as mode 2-0, and CSI reporting mode with higher layer configured PUSCH CQI and no PMI can be called as mode 3-0.

For aperiodic CSI reporting mode for a coverage-limiting UE can be configured among mode 1-0, 2-0 or 3-0. If there is no configuration for a reporting mode is given, a coverage-limiting UE shall assume that mode 1-0 is used.

In other words, a coverage-limiting UE may not follow the reporting modes unless it is configured to so. If it is not configured with any mode, it shall report wide-band CQI without PMI (i.e. mode 1-0) by default. For a UE with narrow-band supports only (e.g., low cost MTC UE) with downlink bandwidth for PDSCH is 6PRBs, PUSCH reporting mode (CSI reporting mode) with 1-0 can be supported without PMI/RI report.

Restricted CSI Measurement Configuration

A coverage-limiting UE may be configured with restricted CSI measurement such that CSI measurement may performed on the configured subframes only. Measuring/computing CSI when a number of repetitions occur in downlink transmissions is described.

FIG. 6 briefly describes an example of restricted CSI measurement. Referring to FIG. 6, repeated subframes may be not aligned with subframe set for restricted measurement.

In the example of FIG. 6, there are two kinds of subframes for CSI reporting. As shown in example of FIG. 6, PDSCH is transmitted over 14 downlink subframes (consecutive) where a subset of subframes is configured for CSI0 and other subset of subframes is configured for CSI1, i.e. two subsets of subframes for CSI are configured. In this case, periodic CSI reporting may become ambiguous.

One approach to handle this ambiguity is to restrict the bundling over either CSI0 or CSI1 (not both). In this method, the subset to be restricted for bundling is determined based on the first subframe of the bundling. For example, the subset to which first subframe belongs is determined as a subset on which bundling is restricted. For example, in FIG. 6, the first subframe belongs to the CSI0, thus, bundling will occur over the subframes belonging to the CSI0 only. For subframes of the other subset, a UE may ignore the restricted measurement configuration and then report CSI over the subframes regardless of the restricted measurement sets.

For aperiodic CSI request, the set of subframes to be restricted is determined based on the downlink subframe among PDCCH (uplink grant) bundling. The bundling may be performed only over the determined set if restricted measurement is configured. Or, aperiodic CSI request, regardless of restrict measurement configuration, counts the downlink subframes where the redundant PDCCHs (uplink grant) are transmitted.

CQI will be calculated for multiple PDSCHs transport block (TB) transmitted in those subframes. In other words, for CQI calculation, the UE shall assume that multiple PDSCHs will be repeated over D subframes where D is the number of PDSCH repetition.

For example, in FIG. 6, 14 consecutive subframes starting the first subframe of SFN (subframe number)=k (k is integer) is used to determine CQI assuming multiple PDSCH transmission over 14 subframes.

If the number of PDCCH repetition and the number of PDSCH repetition (configured) are different, CQI calculation would be based on the number of PDSCH repetition rather than the number of PDCCH repetition.

Thus, using the channel estimations from valid downlink subframes (where uplink grant repetition PDCCHs are transmitted), the UE should assume that the number of PDSCHs are repeated per configured number of PDSCH repetition. When periodic CSI reporting is disabled, eNB may assume that CQI is 0 for a coverage-limiting UE. Or, eNB uses CQI calculated by aperiodic CSI reporting. With this assumption, a few approaches as follows:

(1) Method 1—Based on a CQI Condition

Based on an unrestricted observation interval in time and frequency, the coverage limiting UE shall derive, for each CQI value reported in uplink subframe n (n is integer), the highest CQI index among available CQI indices which satisfies following condition 1, or CQI index 0 if CQI index 1 does not satisfy the condition 1. The modulation to be applied can be determined based on the CQI index.

Condition 1: A single PDSCH transport block repeated over D subframes with a combination of modulation scheme and transport block size corresponding to the CQI index, and occupying a group of downlink physical resource blocks termed the CSI reference resource, could be received with a transport block error probability not exceeding 0.1.

For example, the UE UE may derive, for each CQI value reported in uplink subframe n (n is integer), the highest CQI index among table 3 which satisfies the condition 1, or CQI index 0 if CQI index 1 does not satisfy the condition 1. Table 3 is an example of 4 bit CQI table.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |

TABLE 3-continued

| CQI index | modulation | code rate × 1024 | efficiency |
|---|---|---|---|
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

(2) Method 2—Changing Power Ratio

Assuming D (D is integer and 0<D) times repetition is used for PDSCH transmission, then additional power boosting can be applied.

For example, additional power boosting on PDSCH of $\alpha*10*\log 10(D)$ can be assumed for PDSCH where $0 \leq \alpha \leq 1$. Here, a can be estimated by the UE or can be given by higher layer.

By default, it can be assumed that $\alpha=0.5$. Thus, CRS-to-PDSCH power ratio or CSI-RS-to-PDSCH RS-to-PDSCH power ratio can be adjusted based on additional boosting on PDSCH and the ratio given by higher layer.

Furthermore, a coverage-limiting UE may be configured with choosing either CSI0 or CSI1 such that it assumes repeated transmissions would occur only either in subframes belonging to the CSI0 or CSI1 (but not both).

Valid Subframes

In terms of valid downlink subframes, for a PUCCH or PUSCH (periodic CSI or aperiodic CSI) transmission starts at subframe n (n is integer), the valid downlink subframes may be determined as {m, m+VDSR 1, m+VDSR 2, . . . m+VDSRN} where m-th subframe (m is integer) is the first subframe which transmits uplink grant for n-th subframe and VDSRi (i-th (i is integer) valid downlink subframe for repetition) and N is the number of PDCCH repetition.

Alternatively, a valid downlink subframe is defined as m-th subframe—the first subframe which transmits uplink grant for n-th subframe and CQI will be calculated assuming D subframes (where D is the number of PDSCH repetition) of bundled PDSCH transmission.

For the valid downlink subframe for repetition, it can be determined based on CSI restricted measurement, higher layer configuration or following TDD UL/DL configuration.

If TDD is used, special subframe may not be considered as valid downlink subframe. If a UE supports only 6 PRBs in terms of downlink bandwidth (e.g., low cost MTC UE), the subframe where primary synchronization signal (PSS)/secondary synchronization signal (SSS) is transmitted may not be considered as valid subframes.

PSS and SSS are two special signals for cell search, which are transmitted on each downlink component carrier.

In the case of FDD, the PSS may be transmitted within the last symbol of the first slot of subframes 0 and 5, while the SSS may be transmitted within the second last symbol of the same slot. That is, SSS may be transmitted just prior to the PSS.

In the case of TDD, the PSS may be transmitted within the third symbol of subframes 1 and 6. That is, the PSS may be transmitted within the DwPTS. The SSS may be transmitted in the last symbol of subframes 0 and 5. That is, SSS may be transmitted three symbols ahead of the PSS.

For a coverage-limiting UE, transmission modes (TMs) 8/9/10 may not be supported. Transmission modes 8/9/10 are non-codeook-based precoding supporting modes for multi-layers.

FIG. 7 is a flow chart briefly describing a coverage-limiting UE's operation according to the present invention.

Referring FIG. 7, UE may receive reference signal on a downlink channel from eNB at step S710. The reference signal may be transmitted downlink control channel and/or downlink data channel.

UE may measure CSI on the downlink channel at step S720. The UE may perform the measurement based on the reference signal.

The UE may measure channel quality on subframes configured for a coverage-limited UE when the UE is the coverage-limiting UE.

The subframes on which the measurement performed comprises subsets of subframes for channel state information reporting. Further, subframes in a subset are enabled to be bundled for channel state information measurement.

UE may report CSI including CQI at step S730. The CQI may indicate channel quality based on the CSI measurement.

eNB may perform scheduling and/or adjustment based on the CSI reporting at step S740. For example, eNB may adjust transmission power on downlink and/or uplink The details preformed by UE and eNB are same as closed described before.

FIG. 8 is a block diagram which briefly describes a wireless communication system including an UE 800 and a BS 840. The UE 800 and the BS 840 may operate based on the description as explained above.

In view of downlink, a transmitter may be a part of the BS 840 and a receiver may be a part of the UE 800. In view of uplink, a transmitter may be a part of the UE 800 and a receiver may be a part of the BS 840.

Referring to FIG. 8, the UE 800 may include a processor 810, a memory 820 and a radio frequency (RF) unit 830.

The processor 810 may be configured to implement proposed procedures and/or methods described in this application. For example, the processor 810 may receive reference signal via RF unit 830 based on scheduling. The reference signal may be reference signals for coverage-limiting UE. The processor 810 also may perform CSI measurement based on the reference signal. The CSI measurement may include measuring channel quality. The UE may report CSI including CQI through the RF unit 830. The details are same as described above.

The memory 820 is coupled with the processor 810 and stores a variety of information to operate the processor 810, which includes data information and/or control information. The RF unit 830 is also coupled with the processor 810. The RF unit 830 may transmit and/or receive a radio signal.

The BS 840 may include a processor 850, a memory 860 and a RF unit 870. Here, the BS may be PCell or SCell and the BS may be a macro cell or small cell.

The processor 850 may be configured to implement proposed procedures and/or methods described in this application. For example, the processor 850 may schedule UL/DL. The processor 850 may transmit a reference signal. The reference signal may be a reference signal for a coverage-limiting UE. Further, the processor 850 may receive CSI report containing CSI measured based on the reference signal. The processor 850 may do scheduling and/or adjustment based on the CSI, for example, adjustment on a transmission power. The details are same as described above.

The memory 860 is coupled with the processor 850 and stores a variety of information to operate the processor 850, which includes data information and/or control information.

The RF unit 870 is also coupled with the processor 850. The RF unit 870 may transmit and/or receive a radio signal.

The UE 800 and/or the BS 840 may have single antenna or multiple antennas. The wireless communication system may be called as multiple input/multiple output (MIMO) system when at least one of the UE 800 and the BS 840 has multiple antennas.

While method related to the CSI has been described mainly for the coverage-limited UE so far, the method of the present application can be also applied to UE which can receive data continuously. For example, for the UE to which one or two additional transmission may be perform for HARQ ACK/NACK, extra transmission besides the additional transmission can be perform. In this case, CSI feedback in this application can be applied.

Further, MCS of data transmitted on subframes is determined with MCS of single DCI. In this case, methods in this application (for example, method of determining valid downlink subframe) are applicable.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method of reporting channel state information by a coverage-limited user equipment (UE), the method comprising:
   receiving first signals with repetition on a physical downlink shared channel (PDSCH) over multiple downlink subframes, from a base station (BS);
   receiving second signals with repetition on a physical downlink control channel (PDCCH) over the multiple downlink subframes, from the BS,
   wherein a number of the first signals with repetition and a number of the second signals with repetition are different;
   when the number of the first signals with repetition and the number of the second signals with repetition are different, measuring a channel quality based on the first signals with repetition on the PDSCH while the second signals with repetition on the PDCCH are not used for measuring the channel quality; and
   reporting the channel state information based on the measured channel quality, to the BS,
   wherein a periodic report of the channel state information is disabled by the coverage-limited UE,
   wherein a transmission mode 0 or 1 is used by the coverage-limited UE for reporting the channel state information if a configuration for the transmission mode is not provided by the BS, wherein additional transmission power for D downlink data channels is estimated as α*10*log(D) when the downlink data channel is transmitted repeatedly by D times, where 0≤α≤1, and wherein the measured channel quality is adjusted based on the additional transmission power.

2. The method of claim 1, wherein the channel quality is measured per each configured downlink subframe when a downlink data channel transport block is received with a transport block error probability equal to or less than a given threshold value.

3. The method of claim 2, wherein the downlink data channel transport block is repeated over D subframes with a combination of a modulation scheme and a transport block size corresponding to a channel quality indication (CQI) index and occupies a group of downlink physical resource blocks, where D is an integer greater than 0.

4. The method of claim 3, wherein each of the downlink physical resource blocks is a channel state information reference resource.

5. The method of claim 3, wherein the CQI index has a highest value when the downlink data channel transport block is received with the transport block error probability equal to or less than 0.1.

6. The method of claim 3, wherein the CQI index has a value of 1 when the transport block error probability is equal to or less than 0.1, and wherein the CQI index has a value of 0 when the transport block error probability is more than 0.1 for a case where a value of the CQI index is equal to 1.

7. The method of claim 1, wherein a value of α is signaled by higher level signaling.

8. The method of claim 1, wherein a valid downlink subframe for the coverage-limited UE is a first subframe at which an uplink grant is transmitted when a downlink data channel is transmitted repeatedly over the multiple downlink subframes.

9. The method of claim 1, wherein in the reporting the channel state information, the channel state information is reported without precoding matrix indicator (PMI)-rank indicator (RI) reporting.

10. A user equipment (UE) having a limited coverage, the UE comprising:
a transceiver; and
a processor operatively coupled to the transceiver, that:
controls the transceiver to receive first signals with repetition on a physical downlink shared channel (PDSCH) over multiple downlink subframes, from a base station (BS),
controls the transceiver to receive second signals with repetition on a physical downlink control channel (PDCCH) over the multiple downlink subframes, from the BS,
wherein a number of the first signals with repetition and a number of the second signals with repetition are different,
when the number of the first signals with repetition and the number of the second signals with repetition are different, measures a channel quality based on the first signals with repetition on the PDSCH while the second signals with repetition on the PDCCH are not used for measuring the channel quality, and
reports channel state information based on the measured channel quality, to the BS,
wherein a periodic report of the channel state information is disabled by the coverage-limited UE,
wherein a transmission mode 0 or 1 is used by the coverage-limited UE for reporting the channel state information if a configuration for the transmission mode is not provided by the BS,
wherein additional transmission power for D downlink data channels is estimated as α*10*log(D) when the downlink data channel is transmitted repeatedly by D times, where 0≤α≤1, and
wherein the measured channel quality is adjusted based on the additional transmission power.

* * * * *